United States Patent Office 2,874,630
Patented Feb. 24, 1959

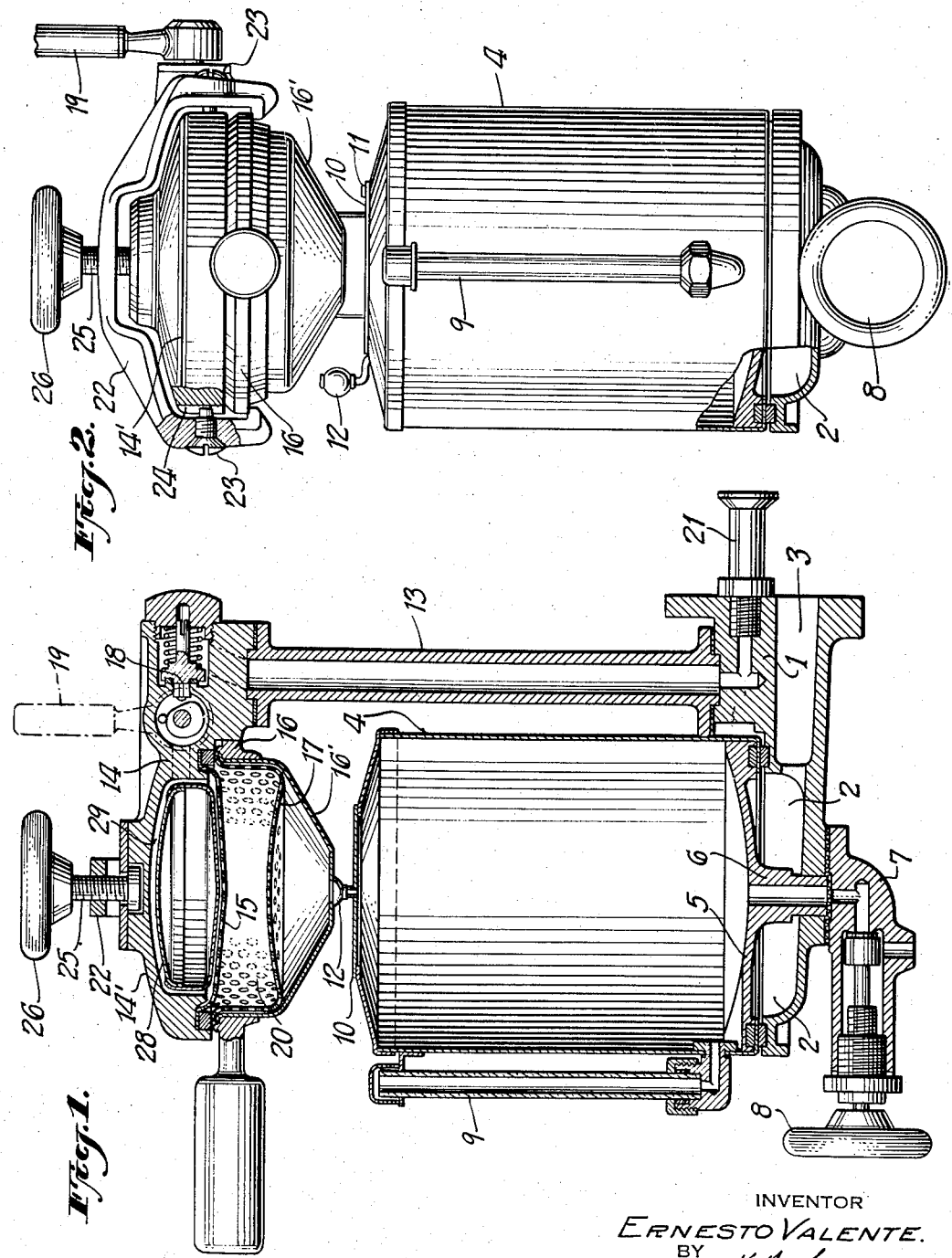

2,874,630

APPARATUS TO MAKE COFFEE IN LARGE QUANTITIES TO BE ADAPTED ON THE BOILER OF A COMMON COFFEE PERCOLATOR FOR BARS, SPECIALLY FIT FOR HOTELS AND THE LIKE

Ernesto Valente, Milan, Italy

Application August 3, 1956, Serial No. 601,946

Claims priority, application Italy November 19, 1955

3 Claims. (Cl. 99—307)

The present invention relates to an apparatus for making coffee, more particularly to an apparatus which can be attached to the conventional boiler of a coffee percolator, increasing the output thereof.

For the needs of hotels, boarding schols, nursing houses and the like, the modern coffee percolators, generally used in bars, even of larger models, are not fit, as in these communities the making of considerable quantities of drinks, in comparatively short intervals is required.

The problem is solved by means of the apparatus to be described later on, with reference to the accompanying drawing illustrating an embodiment of the invention.

In this drawing, Fig. 1 represents the apparatus in an axial section, the apparatus being adapted to be fitted on the bottom of a boiler of a common express coffee percolator for bars; Fig. 2 is a front elevation of the apparatus.

With reference to the drawing, 1 designates an arm bracket, adapted to be fitted on the bottom of the boiler.

The bracket terminates in a cup 2 which communicates through a duct 3, within the arm of the bracket, with the steam chamber of the boiler.

The rim of the cup 2 is tightly connected with the bottom of a vessel 4, having the capacity of about two liters and provided with a bored central hub 6, which extends downwards through and below the bracket 1 for connection with a tap 7, adapted to be operated by means of handle 8.

The vessel 4 is provided with a water gauge 9 and is closed on top by means of a cover 10, swingable on a pivot 11 and provided with knob 12.

A vertical pipe 13 is fixed to the bracket 1 in the rear of the vessel 4.

An arm 14 is fixed on the pipe 13 above the vessel 4, the free end of the arm 14 having the shape of a bell, to which a filter ring 16 holding a coffee filter 17 is fitted.

The filter ring is fixed on the bell by means of clamp 22, provided with opposed radial screws 23, co-operating with outside recesses 24, provided on the bell, so as to prevent rotation of the clamp 22 on the bell.

A screw 25 provided with a handle 26 coaxially connects the clamp with the bell. The screw is screwed on the clamp 22 and has a head at its end revolving in a suitable cavity in the bell.

The top of the pipe 13 communicates through a valve 18, controlled by a cam which is actuated by a knob 19, with an infusion chamber 20. The bottom of the pipe 13 communicates with the water chamber of the conventional boiler, not shown, through a socket 21, fixed at the end of the arm of bracket 1.

The cavity of the bell at the end of the arm 14 and on top of the filter 17, is in part occupied by a body 28, shaped as a small box, to be arranged, in a way not visible on the drawing, so as to remain spaced from a small douche 15 and from the wall of said cavity, in such a way that the hot water arriving from the boiler occupies, above the coffee panel, contained in filter 17, only a clearance 29.

The coffee emerging from the filter 17 is directed through a funnel 16' depending from the ring 16 into the vessel 4 whose cover 10 is temporarily opened whenever hot water is forced through the coffee grinds in the chamber 20.

What is claimed is:

1. A coffee making attachment for conventional coffee boilers, said attachment including a hollow bracket adapted to be connected with the boiler, said bracket having a cup-like end portion having an upper rim, a vessel supported by said end portion for storing the finished coffee, said vessel having a bottom resting on and being steam-tightly fitted on said upper rim, means connected to and connecting the interior of said cup-like end portion for steam flow through said bracket with the steam space of the boiler, a pipe extending upwardly from said bracket and having a lower end connected for hot water flow through said bracket with the water space of the boiler, a hollow arm horizontally extending from and closing the upper end of said pipe, said arm having a bell-like end portion having a lower rim placed above said vessel, the interior of said bell-like end portion communicating through said hollow arm with said pipe, and a funnel having an upper rim removably water-tightly connected with said lower rim, and infusion means placed in said funnel for receiving hot water from said bell-like portion and discharging finished coffee through said funnel into said vessel.

2. A coffee making attachment as defined in claim 1, including a coffee tap, said cup-shaped portion having a bottom portion, said coffee tap being connected to said bottom portion, said bottom of said vessel having a boss projecting downwardly coaxially of and through said bottom portion, and an axial bore in said boss connecting the interior of said vessel for coffee flow with said tap.

3. A coffee making attachment as defined in claim 1, including a clamp stradd'ing in a diametrical plane in inverted U-like manner the outside of said bell-like portion and having hooks at its ends engaging the upper rim of said funnel, a threaded member extending coaxially of said bell-like portion and having a lower end revolvably and axially immovably connected with the top of said bell-like portion, said clamp having a top portion, a threaded bore in said top portion receiving said threaded member, a handle connected with the upper end of said threaded member, and means connected with said clamp and said bell-like portion for preventing rotation of said clamp on said bell-like portion.

References Cited in the file of this patent

UNITED STATES PATENTS

| 423,127 | Childs | Mar. 11, 1890 |
| 726,793 | Bezzera | Apr. 28, 1903 |
| 2,024,859 | Hillseth | Dec. 17, 1935 |
| 2,464,862 | Herrera | Mar. 22, 1949 |

FOREIGN PATENTS

| 649,553 | France | Sept. 3, 1928 |
| 689,600 | France | May 27, 1930 |
| 438,184 | Great Britain | Nov. 12, 1935 |
| 636,894 | Germany | Oct. 17, 1936 |
| 647,877 | Germany | July 15, 1937 |